United States Patent
Okubo et al.

(10) Patent No.: US 12,280,990 B2
(45) Date of Patent: Apr. 22, 2025

(54) WINCH DRIVE DEVICE IN CRANE

(71) Applicant: KOBELCO CONSTRUCTION MACHINERY CO., LTD., Hiroshima (JP)

(72) Inventors: Masaki Okubo, Hyogo (JP); Hitoshi Sakurai, Hyogo (JP); Yoshiki Kamon, Hyogo (JP); Taisuke Tsunoo, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 258 days.

(21) Appl. No.: 18/041,886

(22) PCT Filed: Jul. 30, 2021

(86) PCT No.: PCT/JP2021/028367
§ 371 (c)(1),
(2) Date: Feb. 16, 2023

(87) PCT Pub. No.: WO2022/044699
PCT Pub. Date: Mar. 3, 2022

(65) Prior Publication Data
US 2023/0322532 A1    Oct. 12, 2023

(30) Foreign Application Priority Data

Aug. 25, 2020 (JP) ................ 2020-141397

(51) Int. Cl.
*B66D 1/00* (2006.01)
*B66D 1/44* (2006.01)
*B66D 1/54* (2006.01)

(52) U.S. Cl.
CPC ............... *B66D 1/44* (2013.01); *B66D 1/54* (2013.01); *B66D 2700/0158* (2013.01)

(58) Field of Classification Search
CPC ... B66D 1/44; B66D 1/54; B66D 1/08; B66D 2700/0158; B66D 2700/0133; B66C 13/12; B66C 13/20; B66C 13/42; B66C 23/88
See application file for complete search history.

(56) References Cited

FOREIGN PATENT DOCUMENTS

| CN | 204586632 U | * | 8/2015 |
| CN | 108749691 A | * | 11/2018 |

(Continued)

OTHER PUBLICATIONS

International Search Report issued Oct. 19, 2021 in PCT/JP2021/028367 filed Jul. 30, 2021, 2 pages.

*Primary Examiner* — Emmanuel M Marcelo
(74) *Attorney, Agent, or Firm* — Oblon, McClelland, Maier & Neustadt, L.L.P.

(57) ABSTRACT

When an engine is started in a state where a support member of a multi-coupler is attached to a mating support member, the pressure of hydraulic oil increases in a detection target pipeline part. A pressure detection unit detects the pressure of the hydraulic oil in the detection target pipeline part. A connection state determining unit determines whether a tank-side pipeline part and a motor-side pipeline part are connected to each other, based on the pressure. When the connection state determining unit determines that the tank-side pipeline part and the motor-side pipeline part are not connected to each other in a state where the engine is started, a pressure increase suppression unit carries out an operation for suppressing an increase in the pressure of a hydraulic motor.

9 Claims, 3 Drawing Sheets

(56) References Cited

FOREIGN PATENT DOCUMENTS

| | | | | |
|---|---|---|---|---|
| CN | 208325431 U | * | 1/2019 | |
| CN | 208393205 U | * | 1/2019 | |
| CN | 208439137 U | * | 1/2019 | |
| CN | 110027984 A | | 7/2019 | |
| JP | 8-282978 A | | 10/1996 | |
| JP | 2002-5122 A | | 1/2002 | |
| JP | 2004224509 A | * | 8/2004 | |
| JP | 2006347689 A | * | 12/2006 | |
| JP | 2013-72588 A | | 4/2013 | |
| JP | 2015-165166 A | | 9/2015 | |

* cited by examiner

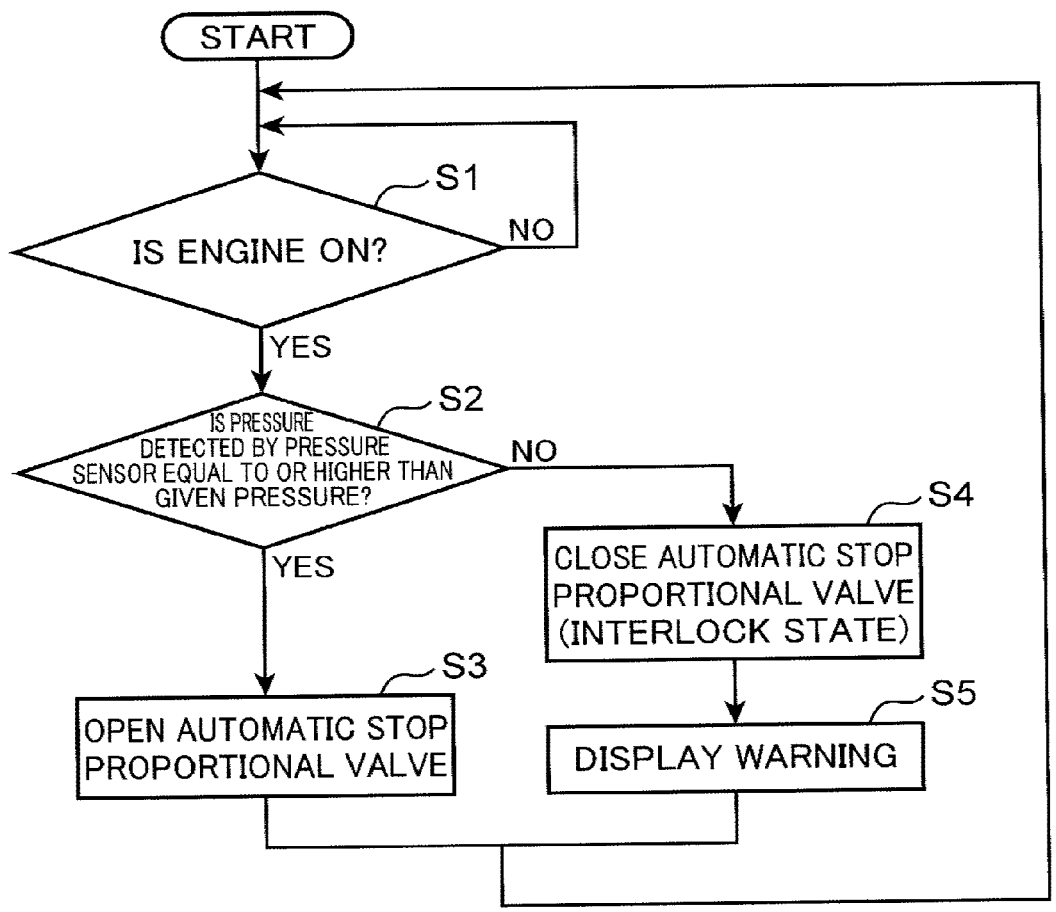

WINCH DRIVE DEVICE IN CRANE

TECHNICAL FIELD

The present disclosure relates to a winch drive device in a crane.

BACKGROUND ART

In general, a crane includes a machine body, a rising/falling member including a boom supported on the machine body so as to be able to rise and fall, a hook suspended from a front end of the rising/falling member via a rope, a winch drum that winds up the rope, a hydraulic motor that rotates the winch drum, and a pump that supplies hydraulic oil to the hydraulic motor. Because part of the hydraulic oil (e.g., some several % of the entire hydraulic oil) supplied from the pump to the hydraulic motor inevitably leaks inside the hydraulic motor, a drain pipeline is connected to the hydraulic motor to recover the oil having leaked inside the hydraulic motor to the tank.

Among various cranes, for example, a crawler crane and a fixed crane are incapable of self-propelling on a public road, and are therefore each transported to a destination by a trailer. When each of these cranes is transported, the crane is disassembled into a plurality of parts so that the width of a component to be transported, the component making up a part of the crane, falls within a specified value range for transportation. For example, as a result of the disassembling, the rising/falling member including the boom and the machine body are separated from each other. At the destination, the plurality of parts transported to the destination are assembled into the crane.

The pump and the tank are usually mounted on the machine body, but the winch drum and the hydraulic motor are fitted to the boom in some cases. In such a case, at transportation of the crane, the drain pipeline connecting the hydraulic motor to the tank is divided into two parts, that is, a tank-side pipeline part and a motor-side pipeline part. If an operator forgets to connect together the tank-side pipeline part and the motor-side pipeline part of the drain pipeline when carrying out work of reassembling the crane, the following problem arises. When an engine is started as the tank-side pipeline part and the motor-side pipeline part of the drain pipeline are not connected together and the operator operates a lever to supply the hydraulic oil to the hydraulic motor, the oil leaking inside the hydraulic motor cannot be recovered into the tank through the drain pipeline. As a result, the internal pressure of the hydraulic motor and the pressure of the motor-side pipeline part of the drain pipeline increase. This may cause a problem, such as failure of the hydraulic motor. This problem may arise not only in the crawler crane and the fixed crane described above but also in other cranes that may be disassembled into a plurality of parts.

Patent Literature 1 discloses a pipe connection detection device and Patent Literature 2 discloses a pipe misconnection detection method, but applying techniques described in these patent literatures to cranes is difficult. It is thus desirable that a technique be developed, the technique properly determining a state of connection between the tank-side pipeline part and the motor-side pipeline part of the drain pipeline in the crane and suppressing an increase in the pressure of the hydraulic motor on the basis of a result the determination.

Specifically, the pipe connection detection device of Patent Literature 1 carries out pipe connection detection according to which in an air conditioning system, a state of connection of an outdoor unit and an indoor unit to a refrigerant pipe is detected through transmission/reception of a pulse signal via the refrigerant pipe. When the indoor unit receives the pulse signal from the outdoor unit, a device control unit determines that the indoor unit is connected to the outdoor unit. On the other hand, when the indoor unit does not receive the pulse signal from the outdoor unit the device control unit determines that the indoor unit is not connected to the outdoor unit. Carrying out such pipe connection detection, however, requires many additional devices, such as a plurality of devices for transmitting and receiving pulse signals and a power supply for using these devices. Besides, the technique of Patent Literature 1 cannot be applied to a part not equipped with a power supply, such as the boom of the crane. If a device or a power supply for transmitting and receiving a pulse signal is mounted on the rising/falling member including the boom, the weight of the rising/falling member increases, which causes a problem of a drop in the performance of the crane.

According to the pipe misconnection detection method of Patent Literature 2, a misconnection detection operation is carried out when a power generator and a heat recovery device are connected through a pipe. According to this misconnection detection operation, in a heat recovery path formed by connecting the power generator and the heat recovery device through the pipe, hot water is circulated while being heated at a given part of the path. Then, a temperature of the hot water circulating in the heat recovery path is detected when the water flows through a prescribed part, and based on the detected temperature, whether the pipe connecting the power generator to the heat recovery device is misconnected is determined. However, the temperature of the hydraulic oil flowing through the drain pipeline in the crane greatly changes depending on the surrounding environment, the operation status of the crane before and after detection of the temperature, and the like. Therefore, it is difficult to determine a connection state of the drain pipeline based on the temperature of the hydraulic oil.

CITATION LIST

Patent Literature

Patent Literature 1: JP 2015-165166 A
Patent Literature 2: JP 2013-72588 A

SUMMARY OF INVENTION

The present disclosure has been made in view of the above problems, and an object thereof is to provide a winch drive device that can suppress an increase in the pressure of a hydraulic motor even when an engine is started in a state in which a tank-side pipeline part and a motor-side pipeline part of a drain pipeline are not connected to each other in a crane.

Provided is a winch drive device in a crane, the winch drive device including: a hydraulic motor that rotates a winch drum disposed on the crane; a tank; a drain pipeline for feeding drain oil in the hydraulic motor back to the tank; a hydraulic pump driven by an engine, the hydraulic pump being configured to discharge hydraulic oil; a pressure supply pipeline connected to the hydraulic pump; a pressure detection unit; a connection state determining unit; a pressure increase suppression unit; and a multi-coupler having a first joint, a second joint, a support member supporting the first and second joints, a first mating joint, a second mating joint, the first and second mating joints being attachable/detachable respectively to/from the first and second joints, and a mating support member supporting the first and second mating joints, the mating support member being attachable/detachable to/from the support member. The drain pipeline includes: a tank-side pipeline part having one end connected to the tank and the other end connected to the first joint; and a motor-side pipeline part having one end connected to the first mating joint and the other end connected to the hydraulic motor. The pressure supply pipeline includes: a pump-side pipeline part having one end connected to the hydraulic pump and the other end connected to the second joint; and a detection target pipeline part having one end connected to the second mating joint. When the support member is attached to the mating support member, the first joint and the first mating joint are connected to each other to couple the tank-side pipeline part and the motor-side pipeline part of the drain pipeline to each other, and the second joint and the second mating joint are connected to each other to couple the pump-side pipeline part and the detection target pipeline part of the pressure supply pipeline to each other. When the engine is started in a state where the support member is attached to the mating support member, to drive the hydraulic pump, a pressure of the hydraulic oil increases in the detection target pipeline part of the pressure supply pipeline. The pressure detection unit is configured to detect a pressure of the hydraulic oil in the detection target pipeline part. The connection state determining unit determines whether the tank-side pipeline part and the motor-side pipeline part of the drain pipeline are connected to each other, based on the pressure detected by the pressure detection unit. The pressure increase suppression unit is configured such that, when the connection state determining unit determines that the tank-side pipeline part and the motor-side pipeline part are not connected to each other in a state where the engine is started, the pressure increase suppression unit carries out an operation for suppressing an increase in a pressure of the hydraulic motor.

BRIEF DESCRIPTION OF DRAWINGS

FIG. 3 is a flowchart showing an example of control carried out by a controller.

DESCRIPTION OF EMBODIMENTS

Figure 1:
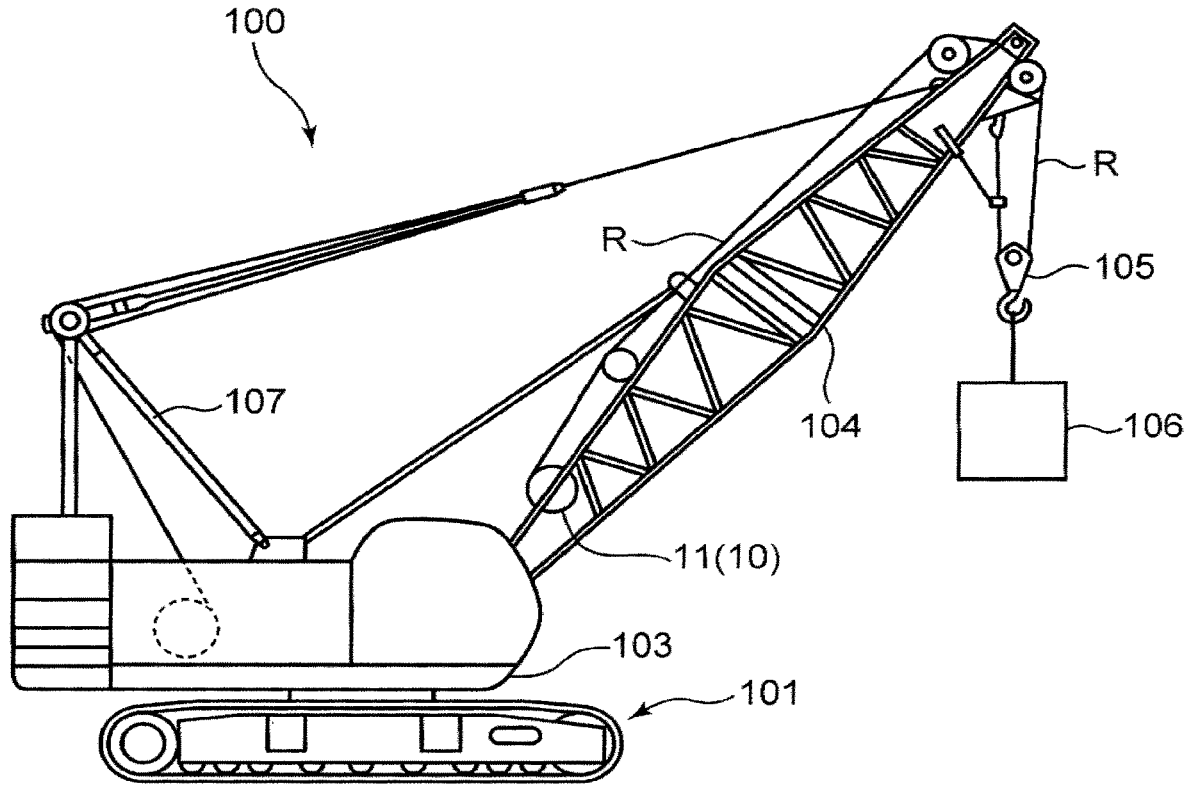
FIG. 1 is a side view of a crane including a winch drive device according to an embodiment of the present disclosure.

Embodiments of the present disclosure will hereinafter be described in detail with reference to the drawings. FIG. 1 is a side view of a crane 100 including a winch drive device according to an embodiment of the present disclosure.

As shown in FIG. 1, the crane 100 includes a lower travelling body 101 capable of self-propelling, an upper slewing body 103 supported by the lower travelling body 101 so as to be slewable about a vertical axis, a boom 104 supported by the upper slewing body 103 so as to be able to rise and fall, a hook 105 suspended from a front end of the boom 104 via a rope R, a gantry 107 attached to the upper slewing body 103, and a winch 10 including a winch drum 11. The lower travelling body 101 and the upper slewing body 103 are an example of the machine body of the crane, and the boom 104 is an example of a rising/falling member supported on the machine body so as to be able to rise and fall. In this embodiment, the boom 104 makes up the rising/falling member, which, however, may further include a jib attached to the front end of the boom 104. In this case, the hook 105 is suspended from a front end of the jib via the rope R.

The winch 10 winds up the rope R connected to the hook 105 on the winch drum 11 or sends the rope R out of the winch drum 11, thereby causing the hook 105 to move up/down to perform load lifting work. The rope R is sent out of the winch drum 11, passes through the front end of the boom 104, and droops from the front end of the boom 104 to hold the hook 105 suspended. A load 106 is hung on the hook 105. The winch drum 11 rotates in one rotation direction (winding rotation direction) around its rotation axis to wind up the rope R, thereby moving the hook 105 up. The winch drum 11 rotates in the direction opposite to the winding rotation direction to send out the rope R, thereby moving the hook 105 down.

As shown in FIG. 1, according to this embodiment, the winch 10 including the winch drum 11 is disposed on the boom 104 (rising/falling member). The winch drum 11 is supported by the boom 104 such that the rotation axis of the winch drum 11 matches the vehicle width direction of the crane 100.

Figure 2:
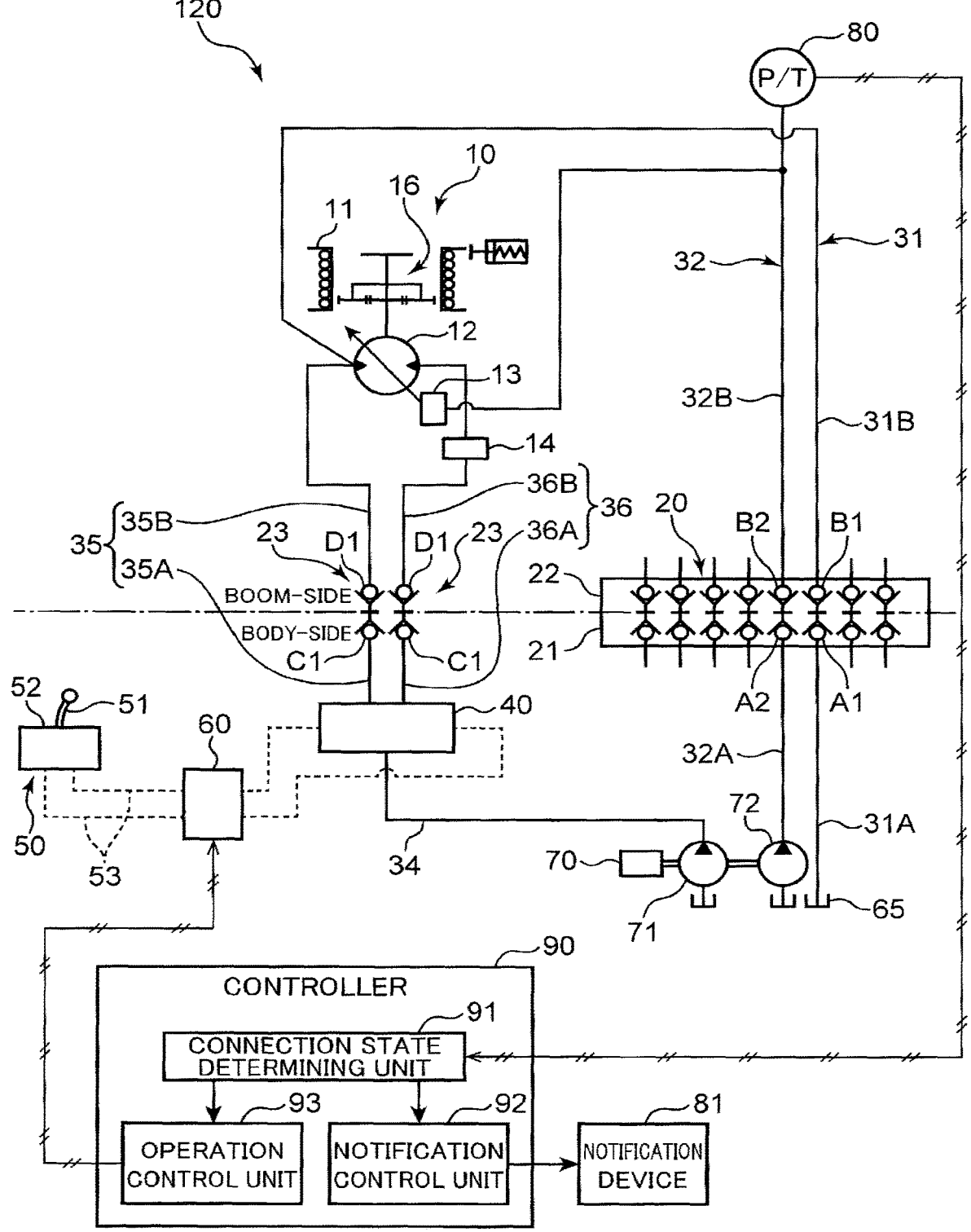
FIG. 2 is a block diagram and a hydraulic circuit diagram of the winch drive device.

FIG. 2 depicts a winch drive device 120. As shown in FIG. 2, the winch drive device 120 includes a hydraulic motor 12, a regulator 13, a multi-coupler 20, a pair of couplers 23 and 23, a drain pipeline 31, a pressure supply pipeline 32, a motor control valve 40, an operation unit 50, an on-off valve 60, a tank 65, a motor pump 71, a pressure supply pipeline pump 72 (an example of a hydraulic pump), a pressure detection unit 80, a notification device 81, and a controller 90.

The multi-coupler 20 includes a plurality of joints, a support member 21 supporting the plurality of joints, a plurality of mating joints attachable/detachable respectively to/from the plurality of joints, and a mating support member 22 supporting the plurality of mating joints, the mating support member 22 being attachable/detachable to/from the support member 21. The plurality of joints include at least a first joint A1 and a second joint A2. The plurality of mating joints include a first mating joint B1 attachable/detachable to/from the first joint A1 and a second mating joint B2 attachable/detachable to/from the second joint A2. In the multi-coupler 20 according to this embodiment, the plurality of joints further include some other joints, in addition to the first joint A1 and the second joint A2, and the plurality of mating joints further include some other mating joints, in addition to the first mating joint B1 and the second mating joint B2. Various pipeline parts connected to these other joints and other mating joints are, however, not shown in FIG. 2.

When the support member 21 is attached to the mating support member 22, the first joint A1 and the first mating joint B1 are connected to each other, and the second joint A2 and the second mating joint B2 are connected to each other. On the other hand, when the support member 21 is detached from the mating support member 22, the first joint A1 and the first mating joint B1 are disconnected from each other and the second joint A2 and the second mating joint B2 are disconnected from each other.

The hydraulic motor 12 is an actuator that causes the winch drum 11 to rotate. In this embodiment, the hydraulic motor 12 is a variable displacement type hydraulic motor. The hydraulic motor 12 has an output shaft that rotates when supplied with hydraulic oil from the motor pump 71. The hydraulic motor 12 has a first port and a second port. When the hydraulic motor 12 is supplied with the hydraulic oil flowing into one port of these ports, the output shaft rotates in a direction corresponding to the one port as the hydraulic oil flows out of the other port.

The winch 10 includes the winch drum 11 and the hydraulic motor 12 that are described above, and further includes a speed reducer 16 and a brake mechanism (not illustrated). The speed reducer 16, which is interposed between the output shaft of the hydraulic motor 12 and the winch drum 11, transmits the power of the hydraulic motor 12 to the winch drum 11, and is configured by, for example, a planetary gear mechanism.

The motor pump 71 and the pressure supply pipeline pump 72 are configured to be each driven by the engine 70 to discharge the hydraulic oil. The motor pump 71 is configured to be capable of supplying the hydraulic oil to the hydraulic motor 12. The pressure supply pipeline pump 72 is configured to be capable of supplying the pressure of the hydraulic oil to the regulator 13 via the pressure supply pipeline 32.

The tank 65 holds drain oil that results in the hydraulic motor 12. Part of the hydraulic oil supplied from the motor pump 71 to the hydraulic motor 12 (e.g., some several % of the entire hydraulic oil) inevitably leaks inside the hydraulic motor 12. Oil (drain oil) leaking inside the hydraulic motor 12 is fed back to the tank 65 through the drain pipeline 31. In other words, the drain pipeline 31 serves as a pipeline for feeding the drain oil in the hydraulic motor 12 back to the tank 65.

The drain pipeline 31 includes a tank-side pipeline part 31A and a motor-side pipeline part 31B. The tank-side pipeline part 31A has one end connected to the tank 65 and the other end connected to the first joint A1. The motor-side pipeline part 31B has one end connected to the first mating joint B1 and the other end connected to the hydraulic motor 12.

The pressure supply pipeline 32 includes a pump-side pipeline part 32A and a detection target pipeline part 32B (regulator side pipeline part). The pump-side pipeline part 32A has one end connected to the pressure supply pipeline pump 72 and the other end connected to the second joint A2. The detection target pipeline part 32B has one end connected to the second mating joint B2 and the other end connected to the regulator 13.

When the support member 21 of the multi-coupler 20 is attached to the mating support member 22, the tank-side pipeline part 31A and the motor-side pipeline part 31B of the drain pipeline 31 are connected to each other via the first joint A1 and the first mating joint B1, and the pump-side pipeline part 32A and the detection target pipeline part 32B of the pressure supply pipeline 32 are coupled to each other via the second joint A2 and the second mating joint B2. On the other hand, when the support member 21 of the multi-coupler 20 is detached from the mating support member 22, the tank-side pipeline part 31A and the motor-side pipeline part 31B of the drain pipeline 31 are decoupled from each other to separate the tank-side pipeline part 31A and the motor-side pipeline part 31B apart from each other, and the pump-side pipeline part 32A and the detection target pipeline part 32B of the pressure supply pipeline 32 are decoupled from each other to separate the pump-side pipeline part 32A and the detection target pipeline part 32B apart from each other.

The pressure supply pipeline 32 is configured such that, when the engine 70 is started in a state where the support member 21 of the multi-coupler 20 is attached to the mating support member 22, the pressure of the hydraulic oil increases in the detection target pipeline part 32B of the pressure supply pipeline 32. The pressure supply pipeline pump 72 can thus supply the pressure of the hydraulic oil to the regulator 13 via the pressure supply pipeline 32.

The regulator 13 is configured to change the capacity of the hydraulic motor 12 by changing its tilt angle according to a pressure supplied to the regulator 13.

The pressure detection unit 80 detects the pressure of the hydraulic oil in the detection target pipeline part 32B of the pressure supply pipeline 32. In this embodiment, the pressure detection unit 80 is a pressure sensor. A signal indicative of a pressure detected by the pressure detection unit 80 is inputted to the controller 90.

The motor control valve 40 is a pilot operation type control valve interposed between the motor pump 71 and the hydraulic motor 12, and has a pair of pilot ports. The motor control valve 40 is a control valve that selectively leads the hydraulic oil for driving the hydraulic motor 12 from the motor pump 71 to the first port or the second port of the hydraulic motor 12 to control the direction of the hydraulic oil supplied to the hydraulic motor 12 and that controls the flow rate of the hydraulic oil supplied to the hydraulic motor 12.

A spool of the motor control valve 40 is held at a neutral position when a pilot pressure is inputted to none of the pair of pilot ports. The spool's being at this neutral position cuts off communication between the motor pump 71 and the hydraulic motor 12, and consequently the hydraulic oil from the motor pump 71 flows back to the tank through a bypass pipeline (not illustrated). When a pilot pressure equal to or higher than a given pressure is supplied to one of the pair of pilot ports, the motor control valve 40 shifts from the neutral position at the stroke corresponding to the magnitude of the pilot pressure. As a result, the hydraulic oil from the motor pump 71 is supplied to one of the first port and the second port of the hydraulic motor 12 at the flow rate corresponding to the stroke, and is discharged from the other of the first port and the second port.

The operation unit 50 is configured to be able to receive an operator's operation for actuating the winch drum 11. Specifically, the operation unit 50 includes an operation lever 51 serving as an operation member that receives the operator's operation, and a pilot valve 52. When receiving an operation given by the operator, the operation lever 51 rotates in the direction of the operation. The pilot valve 52 has an inlet port (not illustrated) connected to a pilot pump (not illustrated), and a pair of outlet ports (not illustrated). The pair of outlet ports are connected to the pair of pilot ports of the motor control valve 40 via a pair of pilot pipelines 53 and 53, respectively. The pilot valve 52 opens to allow the pilot pressure corresponding to the magnitude of an operation of the operation lever 51 to be supplied to the pilot port corresponding to the direction of the operation. As a result, the motor control valve 40 can control the direction and flow rate of the hydraulic oil supplied from the motor pump 71 to the hydraulic motor 12.

The on-off valve 60 is disposed in the pilot pipelines 53 and 53. The on-off valve 60 includes, for example, a proportional valve capable of opening and closing each of the pilot pipelines 53 and 53 according to an incoming signal from the controller 90. Hereinafter, the on-off valve 60 may be referred to as an automatic stop proportional valve.

Each of the pair of couplers 23 and 23 includes a joint C1 and a mating joint D1 attachable/detachable to/from the joint C1.

The motor pump 71 and the motor control valve 40 are connected via a discharge pipeline 34, and the motor control valve 40 and the hydraulic motor 12 are connected via a pair of connection pipelines 35 and 36.

The connection pipeline 35, which is one of the pair of connection pipelines, includes a body-side pipeline part 35A and a boom-side pipeline part 35B. The body-side pipeline part 35A has one end connected to the motor control valve 40 and the other end connected to the joint C1 of one coupler 23 of the pair of couplers 23. The boom-side pipeline part 35B has one end connected to the mating joint D1 of the one coupler 23 and the other end connected to one port of the hydraulic motor 12.

Similarly, the connection pipeline 36, which is the other of the pair of connection pipelines, includes a body-side pipeline part 36A and a boom-side pipeline part 36B. The body-side pipeline part 36A has one end connected to the motor control valve 40 and the other end connected to the joint C1 of the other coupler 23. The boom-side pipeline part 36B has one end connected to the mating joint D1 of the other coupler 23 and the other end connected to the other port of the hydraulic motor 12.

When the joints C1 of the pair of couplers 23 and 23 are attached to the mating joints D1, respectively, the body-side pipeline part 35A and the boom-side pipeline part 35B of the connection pipeline 35 are connected to each other via the one coupler 23, and the body-side pipeline part 36A and the boom-side pipeline part 36B of the connection pipeline 36 are coupled to each other via the other coupler 23. On the other hand, when the joints C1 of the pair of couplers 23 and 23 are detached from the mating joints D1, respectively, the body-side pipeline part 35A and the boom-side pipeline part 35B of the connection pipeline 35 are decoupled from each other to separate the body-side pipeline part 35A and the boom-side pipeline part 35B apart from each other, and the body-side pipeline part 36A and the boom-side pipeline part 36B of the connection pipeline 36 are decoupled from each other to separate the body-side pipeline part 36A and the boom-side pipeline part 36B apart from each other.

As indicated by a single-dot chain line in FIG. 2, a body-side component group made up of a plurality of components including the motor control valve 40, the operation unit 50, the tank 65, the engine 70, the motor pump 71, and the pressure supply pipeline pump 72 is placed on a machine body (specifically, placed in the upper slewing body 103 of the machine body). On the other hand, a boom-side component group made up of a plurality of components including the winch drum 11, the hydraulic motor 12, and the regulator 13 is placed on the boom 104.

In this embodiment, by detaching the support member 21 of the multi-coupler 20 from the mating support member 22 and detaching the joints C1 of the pair of couplers 23 and 23 respectively from the mating joints D1, the body-side component group and the boom-side component group can be separated apart from each other. The tank-side pipeline part 31A of the drain pipeline 31, the pump-side pipeline part 32A of the pressure supply pipeline 32, the body-side pipeline part 35A of the connection pipeline 35, the body-side pipeline part 36A of the connection pipeline 36, the support member 21 of the multi-coupler 20, and respective joints C1 of the pair of couplers 23 and 23 are included in the body-side component group. The motor-side pipeline part 31B of the drain pipeline 31, the detection target pipeline part 32B of the pressure supply pipeline 32, the boom-side pipeline part 35B of the connection pipeline 35, the boom-side pipeline part 36B of the connection pipeline 36, the mating support member 22 of the multi-coupler 20, and respective mating joints D1 of the pair of couplers 23 and 23 are included in the boom-side component group.

The body-side component group, together with other components making up the machine body, is transported to a destination by a trailer while the boom-side component group, together with the boom 104, is transported to the destination by another trailer. At the destination, the body-side component group, boom-side component group, and other components that have been delivered to the destination are assembled into the crane.

The winch drive device 120 further includes a counterbalance valve 14. The counterbalance valve 14 is disposed in the connection pipeline 36, and opens and closes according to a meter-in pressure, which is a pressure of the hydraulic oil that is led into the one port of the hydraulic motor 12 through the connection pipeline 35 at the time of winding down, thereby creating a holding pressure needed to keep the hook 105 and the load 106 hung on the hook 105 from moving down.

The controller 90 includes a computer having a central processing unit (CPU), a ROM, a RAM, and the like. The controller 90 includes a connection state determining unit 91, a notification control unit 92, and an operation control unit 93.

The connection state determining unit 91 determines whether the tank-side pipeline part 31A and the motor-side pipeline part 31B of the drain pipeline 31 are connected to each other, based on a pressure detected by the pressure detection unit 80. Specifically, for example, when a pressure detected by the pressure detection unit 80 is lower than a preset reference pressure, the connection state determining unit 91 determines that the tank-side pipeline part 31A and the motor-side pipeline part 31B of the drain pipeline 31 are not connected to each other. On the other hand, when the pressure detected by the pressure detection unit 80 is equal to or higher than the reference pressure, the connection state determining unit 91 determines that the tank-side pipeline part 31A and the motor-side pipeline part 31B of the drain pipeline 31 are connected to each other.

The winch drive device 120 includes at least one pressure increase suppression unit. The pressure increase suppression unit is configured such that, when the connection state determining unit 91 determines that the tank-side pipeline part 31A and the motor-side pipeline part 31B are not connected to each other in a state where the engine 70 is started, the pressure increase suppression unit carries out an operation for suppressing an increase in the pressure of the hydraulic motor 12.

The notification device 81 is disposed, for example, in a cab of the upper slewing body 103. The notification device 81 is a device (display device) that displays a result of determination by the connection state determining unit 91, a device (sound device) that emits a sound indicating a result of determination by the connection state determining unit 91, or a device (light-emitting device) that emits light indicating a result of determination by the connection state determining unit 91.

The notification control unit 92 controls the notification device 81 such that a result of determination by the connection state determining unit 91 is notified to the operator sitting in the driver's seat of the cab. The notification control unit 92 and the notification device 81 are examples of a pressure increase suppression unit.

When the connection state determining unit 91 determines that the tank-side pipeline part 31A and the motor-side pipeline part 31B of the drain pipeline 31 are not connected to each other, the operation control unit 93 controls the on-off valve 60 so that the pilot pipelines 53 and 53 are shut off. In this case, the operation control unit 93 functions as an on-off valve operation control unit. The on-off valve 60 and the on-off valve operation control unit are examples of the pressure increase suppression unit. In other words, the on-off valve 60 and the on-off valve operation control unit are configured such that, when the connection state determining unit 91 determines that the tank-side pipeline part 31A and the motor-side pipeline part 31B of the drain pipeline 31 are not connected to each other, the on-off valve 60 and the on-off valve operation control unit prevent supply of the hydraulic oil from the motor pump 71 to the hydraulic motor 12, regardless of whether or not the operation lever 51 of the operation unit 50 is operated.

The operation control unit 93 may be configured such when the connection state determining unit 91 determines that the tank-side pipeline part 31A and the motor-side pipeline part 31B of the drain pipeline 31 are not connected to each other, the operation control unit 93 carries out control to stop the engine 70. In this case, the operation control unit 93 functions as an engine operation control unit. The engine operation control unit is an example of the pressure increase suppression unit. Specifically, the engine operation control unit, for example, outputs an instruction signal instructing to stop the engine, to an engine control unit (not illustrated) and the engine control unit receiving the incoming command signal stops the engine. Control for stopping the engine is, however, not limited this process.

The operation control unit 93 may be configured such that, when the connection state determining unit 91 determines that the tank-side pipeline part 31A and the motor-side pipeline part 31B of the drain pipeline 31 are not connected to each other, the operation control unit 93 carries out control to lock the winch drum 11 to prevent the winch drum 11 from rotating. In this case, the operation control unit 93 functions as a winch drum operation control unit. The winch drum operation control unit is an example of the pressure increase suppression unit. The above control carried out by the winch drum operation control unit may include, for example, control (supply blocking control) for blocking supply of the hydraulic oil from the motor pump 71 to the hydraulic motor 12. This supply blocking control may include the above-described control of the on-off valve 60 by which the pilot pipelines 53 and 53 are shut off, may include the above-described control for stopping the engine 70, and may include control of a control valve (not illustrated) by which oil path can be switched to feed the hydraulic oil discharged from the motor pump 71 back to the tank.

FIG. 3 is a flowchart showing an example of control carried out by the controller 90. In the control shown in FIG. 3, the connection state determining unit 91 of the controller 90 determines whether the engine 70 has been started (step S1).

When the engine 70 has been started (YES at step S1), the connection state determining unit 91 determines whether a pressure detected by the pressure detection unit 80 is equal to or higher than the reference pressure (given pressure) (step S2).

When the pressure detected by the pressure detection unit 80 is equal to or higher than the reference pressure (YES at step S2), the operation control unit 93 controls the operation of the on-off valve 60 (automatic stop proportional valve) so as to put the on-off valve 60 in an open state (step S3). This allows supply of the hydraulic oil from the motor pump 71 to the hydraulic motor 12 when the operation lever 51 of the operation unit 50 is operated.

When the pressure detected by the pressure detection unit 80 is lower than the reference pressure (NO at step S2), the operation control unit 93 controls the operation of the on-off valve 60 (automatic stop proportional valve) so as to put the on-off valve 60 in a closed state (step S4). This creates an interlock state in which no pilot pressure is supplied to the pair of pilot ports of the motor control valve 40, and therefore the spool of the motor control valve 40 is held at the neutral position. As a result, supply of the hydraulic oil from the motor pump 71 to the hydraulic motor 12 is blocked, regardless of whether or not the operation lever 51 of the operation unit 50 is operated.

Then, the notification control unit 92 controls the notification device 81 such that a determination result by the connection state determining unit 91, that is, a determination result that the tank-side pipeline part 31A and the motor-side pipeline part 31B of the drain pipeline 31 are not connected to each other is notified to the operator sitting in the driver's seat in the cab (step S5). When the notification device 81 is a display device, the notification device 81 displays a warning indicating the determination result. When the notification device 81 is a sound device, the notification device 81 emits a sound indicating the determination result. When the notification device 81 is a light-emitting device, the notification device 81 emits light indicating the determination result.

The present disclosure is not limited to the embodiment described above. The present disclosure includes, for example, the following modes.

(A) Winch Drum Placement

In the above embodiment, the boom-side component group made up of a plurality of components including the winch drum 11, the hydraulic motor 12, and the regulator 13 is placed on the boom 104. These components, however, may be placed not on the boom 104 but on the machine body (e.g., the upper slewing body 103). Even if the plurality of components including the winch drum 11 are placed on the upper slewing body 103, as mentioned above, when the winch drum 11 is disposed close to such a member as the gantry 107 (see FIG. 1) or a mast (not illustrated), for example, removing the gantry 107 or the mast from the upper slewing body 103 may require that the winch drum 11 to be removed from the upper slewing body 103 for reasons such as spacial restrictions.

(B) Detection Target Pipeline Part of the Pressure Supply Pipeline

In the above embodiment, the other end of the detection target pipeline part 32B of the pressure supply pipeline 32 is connected to the regulator 13. Connection of the other end of the detection target pipeline part 32B is, however, not limited to such an aspect. The other end of the detection target pipeline part 32B of the pressure supply pipeline 32 may be connected to a component different from the regulator 13, provided that the pressure supply pipeline 32 is configured such that, when the engine 70 is started in a state where the support member 21 of the multi-coupler 20 is attached to the mating support member 22, the pressure of the hydraulic oil increases in the detection target pipeline part 32B of the pressure supply pipeline 32.

(C) Hydraulic Motor

In the above embodiment, the hydraulic motor 12 is the variable displacement type hydraulic motor. When the other end of the detection target pipeline part 32B of the pressure supply pipeline 32 is connected to a component different from the regulator 13, however, the hydraulic motor 12 may be a fixed displacement type hydraulic motor.

(D) Operation Unit

In the above embodiment, the operation unit 50 has the pilot valve 52. The operation unit 50 is, however, not limited to such an aspect having the pilot valve. The operation unit may be an electric lever device that outputs, to the controller 90, a signal corresponding to an angle of the rotation in response to the rotation of the operation lever.

(E) Pump

In the above embodiment, the motor pump 71 that discharges the hydraulic oil to be supplied to the hydraulic motor 12 is a pump different from the pressure supply pipeline pump 72 connected to the pressure supply pipeline 32. The pump configuration is, however, not limited to this. The pressure supply pipeline pump 72 connected to the pressure supply pipeline 32 and the pump that discharges the hydraulic oil to be supplied to the hydraulic motor 12 may make up a single pump.

(F) Pressure Increase Suppression Unit

The pressure increase suppression unit may be configured such that, when the connection state determining unit 91 determines that the tank-side pipeline part 31A and the motor-side pipeline part 31B of the drain pipeline 31 are not connected to each other, the pressure increase suppression unit blocks supply of the hydraulic oil from the motor pump 71 to the hydraulic motor 12. Such a pressure increase suppression unit may include, for example, the on-off valve 60 and the on-off valve operation control unit, may include the engine operation control unit, or may include other constituent elements.

(G) Winch Drive Device

The winch drive device according to the above embodiment is a device that causes the hook 105 to move up and down and perform a load lifting work. Use of the winch drive device is, however, not limited to the use according to the embodiment. The winch drive device may be, for example, a winch drive device for rising/falling motion that causes the rising/falling member to rise and fall. One form of the winch drive device for rising/falling motion is, for example, a winch drive device that causes the jib to rise and fall, the jib being fitted to the front end of the boom so as to be able to rise and fall relative to the boom, and other forms of the winch drive device for rising/falling motion may also possible.

(H) Crane Type

The crane according to the above embodiment is a crawler crane. The winch drive device of the present disclosure, however, may be applied not only to the crawler crane but also to other cranes incapable of self-propelling on the public road, such as a fixed crane. When a crane capable of self-propelling on the public road, such as a wheel crane, is transported in its disassembled form for various reasons, the winch drive device of the present disclosure may be applied also to such a crane.

According to the present disclosure, a winch drive device is provided, which can suppress an increase in the pressure of a hydraulic motor even when an engine is started in a state in which a tank-side pipeline part and a motor-side pipeline part of a drain pipeline are not connected to each other.

Provided is a winch drive device in a crane, the winch drive device including: a hydraulic motor that rotates a winch drum disposed on the crane; a tank; a drain pipeline for feeding drain oil in the hydraulic motor back to the tank; a hydraulic pump driven by an engine, the hydraulic pump being configured to discharge hydraulic oil; a pressure supply pipeline connected to the hydraulic pump; a pressure detection unit; a connection state determining unit; a pressure increase suppression unit; and a multi-coupler having a first joint, a second joint, a support member supporting the first and second joints, a first mating joint, a second mating joint, the first and second mating joints being attachable/detachable respectively to/from the first and second joints, and a mating support member supporting the first and second mating joints, the mating support member being attachable/detachable to/from the support member. The drain pipeline includes: a tank-side pipeline part having one end connected to the tank and the other end connected to the first joint; and a motor-side pipeline part having one end connected to the first mating joint and the other end connected to the hydraulic motor. The pressure supply pipeline includes: a pump-side pipeline part having one end connected to the hydraulic pump and the other end connected to the second joint; and a detection target pipeline part having one end connected to the second mating joint. When the support member is attached to the mating support member, the first joint and the first mating joint are connected to each other to couple the tank-side pipeline part and the motor-side pipeline part of the drain pipeline to each other, and the second joint and the second mating joint are connected to each other to couple the pump-side pipeline part and the detection target pipeline part of the pressure supply pipeline to each other. When the engine is started in a state where the support member is attached to the mating support member, to drive the hydraulic pump, a pressure of the hydraulic oil increases in the detection target pipeline part of the pressure supply pipeline. The pressure detection unit is configured to detect a pressure of the hydraulic oil in the detection target pipeline part. The connection state determining unit determines whether the tank-side pipeline part and the motor-side pipeline part of the drain pipeline are connected to each other, based on the pressure detected by the pressure detection unit. The pressure increase suppression unit is configured such that, when the connection state determining unit determines that the tank-side pipeline part and the motor-side pipeline part are not connected to each other in a state where the engine is started, the pressure increase suppression unit carries out an operation for suppressing an increase in a pressure of the hydraulic motor.

According to this winch drive device, by the multi-coupler in which the first joint and the second joint are supported by the same support member and the first mating joint and the second mating joint are supported by the same mating support member, the tank-side pipeline part and the motor-side pipeline part of the drain pipeline are coupled to each other and the pump-side pipeline part and the detection target pipeline part of the pressure supply pipeline are coupled to each other. By attaching the support member to the mating support member, therefore, connection between the tank-side pipeline part and the motor-side pipeline part of the drain pipeline and connection between the pump-side pipeline part and the detection target pipeline part of the pressure supply pipeline are established simultaneously. Because the detection target pipeline part of the pressure supply pipeline is connected to the hydraulic pump via the pump-side pipeline of the pressure supply pipeline, the second joint, and the second mating joint, when the engine is started in a state where the support member is attached to the mating support member, to drive the hydraulic pump, the pressure of the hydraulic oil increases in the detection target pipeline part of the pressure supply pipeline. Because of this fact, the pressure of the hydraulic oil in the detection target pipeline part of the pressure supply pipeline can be used as an index value based on which whether the tank-side pipeline part and the motor-side pipeline part of the drain pipeline are connected to each other is determined. When the connection state determining unit determines that the tank-side pipeline part and the motor-side pipeline part are not connected to each other in a state where the engine is started, the pressure increase suppression unit carries out an operation for suppressing an increase in the pressure of the hydraulic motor. Even when the engine is started in a state where the tank-side pipeline part and the motor-side pipeline part of the drain pipeline are not connected to each other, therefore, an increase in the pressure of the hydraulic motor is suppressed. This prevents the occurrence of a problem, such as a failure of the hydraulic motor. It should be noted that the pressure of the hydraulic oil in the drain pipeline is low and unstable, and is therefore unsuitable for being used as the index value based on which whether the tank-side pipeline part and the motor-side pipeline part of the drain pipe are connected to each other is determined.

Specifically, for example, it is preferable that the winch drive device further include a regulator, in which the hydraulic motor is a variable displacement type hydraulic motor, the detection target pipeline part of the pressure supply pipeline has the other end connected to the regulator, the hydraulic pump is configured to be capable of supplying the pressure of the hydraulic oil to the regulator via the pressure supply pipeline, and the regulator is configured to change a tilt angle of the hydraulic motor according to a pressure supplied to the regulator, thus changing the capacity of the hydraulic motor. In this aspect, the pressure supply pipeline is a pipeline for supplying a pressure for adjusting the tilt angle of the hydraulic motor, to the regulator, and after the engine is started, the hydraulic pump constantly supplies the pressure of the hydraulic oil to the regulator and to the pressure supply pipeline. When the hydraulic motor is the variable displacement type hydraulic motor, the regulator and the pressure supply pipeline are components that are always provided. In this aspect, therefore, when the winch drive device is constructed, a connection state of the drain pipeline can be determined properly by effectively using the regulator and the pressure supply pipeline, which are existing components.

According to the winch drive device, it is preferable that, when a pressure detected by the pressure detection unit is lower than a preset reference pressure, the connection state determining unit determine that the tank-side pipeline part and the motor-side pipeline part of the drain pipeline are not connected to each other. When a pressure increase tendency at the pressure supply pipeline after the start of the engine is known in advance (specifically, for example, in the above case where the pressure supply pipeline is the pipeline for supplying the pressure for adjusting the tilt angle of the hydraulic motor to the regulator), a state of connection between the tank-side pipeline part and the motor-side pipeline part can be determined based on the preset reference pressure as the pressure increase tendency is taken into consideration, in the same manner as in this aspect.

According to the winch drive device, it is preferable that the pressure increase suppression unit include a notification device disposed in a cab of the crane, and a notification control unit that controls the notification device such that a determination result by the connection state determining unit is notified to an operator sitting in the driver's seat of the cab. In this aspect, the operator can know a state of connection between the tank-side pipeline part and the motor-side pipeline part of the drain pipeline, based on information acquired from the notification device. Even when the engine is started in a state where the tank-side pipeline part and the motor-side pipeline part of the drain pipeline are not connected to each other, therefore, the operator can suppress an increase in the pressure of the hydraulic motor by taking a proper measure following the start of the engine. The proper measure taken by the operator may include, for example, the operator's executing an operation of stopping the engine, based on information outputted from the notification device controlled by the notification control unit, and may include also the operator's properly connecting together the tank-side pipeline part and the motor-side pipeline part of the drain pipeline, based on information outputted from the notification device controlled by the notification control unit.

Specifically, for example, it is preferable that the notification device be a device that displays the determination result by the connection state determining unit, a device that emits a sound indicating the determination result by the connection state determining unit, or a device that emits light indicating the determination result by the connection state determining unit. In this aspect, the operator can visually or audibly know the state of connection between the tank-side pipeline part and the motor-side pipeline part of the drain pipeline, by seeing the displayed determination result or light indicating the determination result or listening to the sound indicating the determination result.

It is preferable that the winch drive device further include an operation unit that receives the operator's operation for actuating the winch drum, and a motor pump configured to discharge hydraulic oil to be supplied to the hydraulic motor, in which the pressure increase suppression unit is configured such that, when the connection state determining unit determines that the tank-side pipeline part and the motor-side pipeline part of the drain pipeline are not connected to each other, the pressure increase suppression unit blocks supply of the hydraulic oil from the motor pump to the hydraulic motor, regardless of whether or not the operation unit has received the operation. In this aspect, even when the engine is started in a state where the tank-side pipeline part and the motor-side pipeline part of the drain pipeline are not connected to each other, the hydraulic oil from the motor pump is not supplied to the hydraulic motor, regardless of whether or not the operation unit has received the operation. An increase in the pressure of the hydraulic motor is therefore effectively suppressed.

Specifically, for example, it is preferable that the winch drive device further include a motor control valve of a pilot-operation-type that is interposed between the motor pump and the hydraulic motor and that controls the direction and the flow rate of hydraulic oil according to the operation received by the operation unit, the hydraulic oil being supplied from the motor pump to the hydraulic motor, in which the pressure increase suppression unit includes an on-off valve disposed in a pilot pipeline for supplying a pilot pressure to the motor control valve, and an on-off valve operation control unit that, when the connection state determining unit determines that the tank-side pipeline part and the motor-side pipeline part of the drain pipeline are not connected to each other, controls the on-off valve so that the pilot pipeline is shut off. In this aspect, even when the engine is started in a state where the tank-side pipeline part and the motor-side pipeline part of the drain pipeline are not connected to each other, the pilot pipeline is shut off by the on-off valve to prevent supply of the hydraulic oil from the motor pump to the hydraulic motor. An increase in the pressure of the hydraulic motor is therefore effectively suppressed.

The winch drive device may further include a motor pump configured to be driven by the engine and discharge hydraulic oil to be supplied to the hydraulic motor, in which the pressure increase suppression unit includes an engine operation control unit that, when the connection state determining unit determines that the tank-side pipeline part and the motor-side pipeline part of the drain pipeline are not connected to each other, carries out control for stopping the engine. In this aspect, even when the engine is started in a state where the tank-side pipeline part and the motor-side pipeline part of the drain pipeline are not connected to each other, the hydraulic oil is not discharged from the hydraulic pump after the control by the engine operation control unit stops the engine. As a result, an increase in the pressure of the hydraulic motor is effectively suppressed.

The winch drive device further includes a motor pump configured to discharge hydraulic oil to be supplied to the hydraulic motor, in which the pressure increase suppression unit is configured such that, when the connection state determining unit determines that the tank-side pipeline part and the motor-side pipeline part of the drain pipeline are not connected to each other, the pressure increase suppression unit blocks supply of the hydraulic oil from the motor pump to the hydraulic motor. In this aspect, even when the engine is started in a state where the tank-side pipeline part and the motor-side pipeline part of the drain pipeline are not connected to each other, the supply of the hydraulic oil from the motor pump to the hydraulic motor is blocked. An increase in the pressure of the hydraulic motor is therefore effectively suppressed.

The invention claimed is:

1. A winch drive device in a crane, comprising:
a hydraulic motor that rotates a winch drum disposed on the crane;
a tank;
a drain pipeline for feeding drain oil in the hydraulic motor back to the tank;
a hydraulic pump driven by an engine, the hydraulic pump being configured to discharge hydraulic oil;
a pressure supply pipeline connected to the hydraulic pump;
a pressure detection unit;
a connection state determining unit;
a pressure increase suppression unit; and
a multi-coupler having a first joint, a second joint, a support member supporting the first and second joints, a first mating joint, a second mating joint, the first and second mating joints being attachable/detachable respectively to/from the first and second joints, and a mating support member supporting the first and second mating joints, the mating support member being attachable/detachable to/from the support member,
wherein the drain pipeline includes:
a tank-side pipeline part having one end connected to the tank and the other end connected to the first joint; and
a motor-side pipeline part having one end connected to the first mating joint and the other end connected to the hydraulic motor,
the pressure supply pipeline includes:
a pump-side pipeline part having one end connected to the hydraulic pump and the other end connected to the second joint; and
a detection target pipeline part having one end connected to the second mating joint,
when the support member is attached to the mating support member, the first joint and the first mating joint are connected to each other to couple the tank-side pipeline part and the motor-side pipeline part of the drain pipeline to each other, and the second joint and the second mating joint are connected to each other to couple the pump-side pipeline part and the detection target pipeline part of the pressure supply pipeline to each other, when the engine is started in a state where the support member is attached to the mating support member, to drive the hydraulic pump, a pressure of the hydraulic oil increases in the detection target pipeline part of the pressure supply pipeline,
the pressure detection unit is configured to detect a pressure of the hydraulic oil in the detection target pipeline part,
the connection state determining unit determines whether the tank-side pipeline part and the motor-side pipeline part of the drain pipeline are connected to each other, based on a pressure detected by the pressure detection unit, and
the pressure increase suppression unit is configured such that, when the connection state determining unit determines that the tank-side pipeline part and the motor-side pipeline part are not connected to each other in a state where the engine is started, the pressure increase suppression unit carries out an operation for suppressing an increase in a pressure of the hydraulic motor.

2. The winch drive device according to claim 1, further comprising a regulator,
wherein the hydraulic motor is a variable displacement type hydraulic motor,
the detection target pipeline part of the pressure supply pipeline has the other end connected to the regulator,
the hydraulic pump is configured to be capable of supplying a pressure of the hydraulic oil to the regulator via the pressure supply pipeline, and
the regulator is configured to change a tilt angle of the hydraulic motor according to a pressure supplied to the regulator, thus changing a capacity of the hydraulic motor.

3. The winch drive device according to claim 1, wherein when a pressure detected by the pressure detection unit is lower than a preset reference pressure, the connection state determining unit determines that the tank-side pipeline part and the motor-side pipeline part of the drain pipeline are not connected to each other.

4. The winch drive device according to claim 1, wherein the pressure increase suppression unit includes:
a notification device disposed in a cab of the crane; and
a notification control unit that controls the notification device such that a determination result by the connection state determining unit is notified to an operator sitting in a driver's seat of the cab.

5. The winch drive device according to claim 4, wherein the notification device is a device that displays the determination result by the connection state determining unit, a device that emits a sound indicating the determination result by the connection state determining unit, or a device that emits light indicating the determination result by the connection state determining unit.

6. The winch drive device according to claim 1, further comprising:
an operation unit that receives an operator's operation for actuating the winch drum; and
a motor pump configured to discharge hydraulic oil to be supplied to the hydraulic motor,
wherein the pressure increase suppression unit is configured such that, when the connection state determining unit determines that the tank-side pipeline part and the motor-side pipeline part of the drain pipeline are not connected to each other, the pressure increase suppression unit blocks supply of the hydraulic oil from the motor pump to the hydraulic motor, regardless of whether or not the operation unit has received the operation.

7. The winch drive device according to claim 6, further comprising a motor control valve of a pilot-operation-type that is interposed between the motor pump and the hydraulic motor and that controls a direction and a flow rate of hydraulic oil according to the operation received by the operation unit, the hydraulic oil being supplied from the motor pump to the hydraulic motor, wherein the pressure increase suppression unit includes:

an on-off valve disposed in a pilot pipeline for supplying a pilot pressure to the motor control valve; and an on-off valve operation control unit that, when the connection state determining unit determines that the tank-side pipeline part and the motor-side pipeline part of the drain pipeline are not connected to each other, controls the on-off valve so that the pilot pipeline is shut off.

8. The winch drive device according to claim 1, further comprising a motor pump configured to be driven by the engine and discharge hydraulic oil to be supplied to the hydraulic motor, wherein the pressure increase suppression unit includes an engine operation control unit that, when the connection state determining unit determines that the tank-side pipeline part and the motor-side pipeline part of the drain pipeline are not connected to each other, carries out control for stopping the engine.

9. The winch drive device according to claim 1, further comprising a motor pump configured to discharge hydraulic oil to be supplied to the hydraulic motor, wherein the pressure increase suppression unit is configured such that, when the connection state determining unit determines that the tank-side pipeline part and the motor-side pipeline part of the drain pipeline are not connected to each other, the pressure increase suppression unit blocks supply of the hydraulic oil from the motor pump to the hydraulic motor.

* * * * *